United States Patent
Zhang et al.

(10) Patent No.: US 11,819,755 B2
(45) Date of Patent: Nov. 21, 2023

(54) VR SYSTEM AND POSITIONING AND TRACKING METHOD OF VR SYSTEM

(71) Applicant: QINGDAO PICO TECHNOLOGY CO., LTD., Shandong (CN)

(72) Inventors: Xiuzhi Zhang, Shandong (CN); Hongwei Zhou, Shandong (CN); Guanghui Liu, Shandong (CN); Hengjiang Guo, Shandong (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 17/885,103

(22) Filed: Aug. 10, 2022

(65) Prior Publication Data

US 2022/0379197 A1    Dec. 1, 2022

Related U.S. Application Data

(63) Continuation of application No. PCT/CN2021/114361, filed on Aug. 24, 2021.

(30) Foreign Application Priority Data

Dec. 31, 2020   (CN) .......................... 202011619535.9

(51) Int. Cl.
- *A63F 13/211* (2014.01)
- *A63F 13/213* (2014.01)
- *A63F 13/25* (2014.01)

(52) U.S. Cl.
CPC .......... *A63F 13/211* (2014.09); *A63F 13/213* (2014.09); *A63F 13/25* (2014.09); *A63F 2300/8082* (2013.01)

(58) Field of Classification Search
CPC ...... A63F 13/211; A63F 13/213; A63F 13/25; A63F 2300/8082
See application file for complete search history.

(56) References Cited

U.S. PATENT DOCUMENTS

| 10,558,261 B1 * | 2/2020 | Zhang | G06F 3/0346 |
| 10,687,050 B2 * | 6/2020 | Hildreth | H04N 13/296 |

(Continued)

FOREIGN PATENT DOCUMENTS

| CN | 102869310 A | 1/2013 |
| CN | 107153369 A | 9/2017 |

(Continued)

OTHER PUBLICATIONS

International Search Report dated Nov. 3, 2021 in International Application No. PCT/CN2021/114361, with English translation (7 pages).

(Continued)

*Primary Examiner* — Seng H Lim

(57) ABSTRACT

A VR system and a positioning and tracking method of the VR system are provided. The VR system includes a head-mounted display and a gamepad. The head-mounted display includes a first inertial sensor, a first processor, and first cameras. The gamepad includes a second inertial sensor and second cameras. The first processor is configured to obtain 6DOF data of the head-mounted display under a world coordinate system based on the inertial data of the head-mounted display obtained by the first inertial sensor and the external environment images of the head-mounted display obtained by the first cameras, obtain 6DOF data of the gamepad under the world coordinate system based on the inertial data of the gamepad obtained by the second inertial sensor and the external environment images of the gamepad obtained by the second cameras, and generate 6DOF data of the gamepad on the head-mounted display.

10 Claims, 6 Drawing Sheets

(56) References Cited

U.S. PATENT DOCUMENTS

| | | | |
|---|---|---|---|
| 11,347,303 B2* | 5/2022 | Stafford | A63F 13/25 |
| 2012/0201424 A1* | 8/2012 | Masalkar | A63F 13/213 |
| | | | 382/106 |
| 2013/0063580 A1 | 3/2013 | Ogawa et al. | |
| 2015/0352437 A1 | 12/2015 | Koseki et al. | |
| 2016/0260251 A1* | 9/2016 | Stafford | G02B 27/0179 |
| 2018/0047332 A1* | 2/2018 | Kuwahara | G09G 3/2096 |
| 2018/0108179 A1* | 4/2018 | Tomlin | G06F 3/0346 |
| 2018/0217663 A1* | 8/2018 | Chandrasekhar | G06F 3/014 |
| 2018/0224887 A1* | 8/2018 | Pitigoi-Aron | H04L 12/40032 |
| 2018/0330521 A1* | 11/2018 | Samples | G06F 3/011 |
| 2019/0108652 A1* | 4/2019 | Linde | G02B 27/017 |
| 2019/0110264 A1* | 4/2019 | Chung | H04W 56/002 |
| 2019/0187783 A1* | 6/2019 | Sevostianov | A63F 13/212 |
| 2019/0243472 A1* | 8/2019 | Stafford | A63F 13/216 |
| 2019/0313039 A1* | 10/2019 | Aggarwal | H04N 23/73 |
| 2019/0320293 A1* | 10/2019 | Ho | H04W 4/029 |
| 2019/0344173 A1 | 11/2019 | Mucha et al. | |
| 2020/0068187 A1* | 2/2020 | Linde | G02B 27/0176 |
| 2020/0174552 A1* | 6/2020 | Stafford | G01C 19/5783 |
| 2021/0104211 A1* | 4/2021 | John | G06F 3/017 |
| 2021/0176379 A1* | 6/2021 | Shin | H04N 21/242 |
| 2021/0365064 A1* | 11/2021 | Liu | G06F 3/0346 |
| 2022/0379197 A1 | 12/2022 | Zhang et al. | |
| 2023/0004218 A1* | 1/2023 | Zhang | G06F 3/013 |

FOREIGN PATENT DOCUMENTS

| | | |
|---|---|---|
| CN | 107168515 A | 9/2017 |
| CN | 107329593 A | 11/2017 |
| CN | 207704395 U | 8/2018 |
| CN | 109497944 A | 3/2019 |
| CN | 109633632 A | 4/2019 |
| CN | 209373535 U | 9/2019 |
| CN | 111061363 A | 4/2020 |
| CN | 112822480 A | 5/2021 |
| EP | 4064005 A1 | 9/2022 |
| WO | WO2017213939 A1 | 12/2017 |

OTHER PUBLICATIONS

Notification of Grant dated Feb. 25, 2022 in Chinese Application No. 202011619535.9, with English translation (5 pages).

* cited by examiner

VR SYSTEM AND POSITIONING AND TRACKING METHOD OF VR SYSTEM

CROSS-REFERENCE TO RELATED APPLICATION

This application is a continuation of International Application No. PCT/CN2021/114361 filed on Aug. 24, 2021, which claims priority to Chinese Patent Application No. 202011619535.9, filed to the China National Intellectual Property Administration on Dec. 31, 2020 and entitled "VR System and Positioning and Tracking Method of VR System", the content of each of which is hereby incorporated by reference in its entirety.

TECHNICAL FIELD

The present disclosure relates to the technical field of virtual reality, and in particular to a VR system and a positioning and tracking method of the VR system.

BACKGROUND

In the design of all-in-one Virtual Reality (VR) Six Degrees of Freedom (6DOF) machines, most of the machines support 6DOF head tracking, determine a relative position relationship between an Head-mounted display (HMD) and a gamepad through optical, ultrasonic and electromagnetic solutions, etc., and convert, based on a current HMD 6DOF, a position of the gamepad into a world coordinate system of the gamepad through mapping of a relative relationship. An optical gamepad has a Field of View (FOV) problem, and large errors can be introduced outside the FOV of an HMD camera. An ultrasonic solution has problems of shielding and reflection, has a high requirement on wireless synchronization, and may introduce certain errors due to wireless fluctuation. An electromagnetic solution can realize 360-degree tracking, but is greatly influenced by an external magnetic field, and in addition, mutual interference between devices is also a problem hard to solve, and usually simultaneous working of many devices is not supported.

Relative position conversion of electromagnetic wave and ultrasonic wave is based on positions of ultrasonic and electromagnetic receivers on the HMD, the requirement on product assembly consistency is high, and product precision will be affected by factors such as device drop in later use.

SUMMARY

Embodiments of the present disclosure provide a VR system for obtaining 6DOF data of a gamepad on a head-mounted display with high precision and low time latency, and a positioning and tracking method of the VR system.

The VR system provided in the embodiments of the present disclosure includes a head-mounted display and a gamepad, the head-mounted display includes a first inertial sensor, a first processor, and a plurality of first cameras, the gamepad includes a second inertial sensor and a plurality of second cameras, the first cameras are configured to obtain external environment images of a coordinate system of the head-mounted display, the first inertial sensor is configured to obtain inertial data of the head-mounted display, the second cameras are configured to obtain external environment images of a coordinate system of the gamepad, the second inertial sensor is configured to obtain inertial data of the gamepad, and the first processor is configured to obtain 6DOF data of the head-mounted display under a world coordinate system based on the inertial data of the head-mounted display and the external environment images of the coordinate system of the head-mounted display obtained by the first cameras, obtain 6DOF data of the gamepad under the world coordinate system based on the external environment images of the coordinate system of the gamepad obtained by the second cameras and the inertial data of the gamepad obtained by the second inertial sensor, and generate 6DOF data of the gamepad on the head-mounted display.

In at least one exemplary embodiment, the VR system may further include a first time synchronization module, configured to synchronize time of the head-mounted display and time of the gamepad by taking the head-mounted display as a master device and the gamepad as a slave device, and obtaining a time deviation between the head-mounted display and the gamepad via transmission of a data signal between the master device and the slave device.

In at least one exemplary embodiment, the head-mounted display may further include a first wireless transmission module, the gamepad may further include a second wireless transmission module, and the first wireless transmission module and the second wireless transmission module are configured to parse and return a data signal at a physical layer.

In at least one exemplary embodiment, the first wireless transmission module is configured to send a synchronization signal at time T1, the second wireless transmission module is configured to receive the synchronization signal at time T2, the first wireless transmission module is configured to send a data packet of the master device containing the time T1 to the slave device, after a latency of set time, the second wireless transmission module is configured to send a data packet of the slave device containing time T3 to the master device at the time T3, the master device is configured to receive the data packet of the slave device at time T4, the first wireless transmission module is configured to send a data packet of the master device containing the time T4 to the slave device, and the first time synchronization module is configured to obtain a time deviation T0 between the head-mounted display and the gamepad through the following equation:

$$T0=(T2-T1-T4+T3)/2.$$

In at least one exemplary embodiment, the VR system may further include a second time synchronization module configured to synchronize the time of the head-mounted display and the time of the gamepad based on a time stamp, and the second time synchronization module includes: a first time stamp adding unit, a second time stamp adding unit, and a first time synchronization unit.

The first time stamp adding unit is configured to add, according to a center time point of exposure, a first time stamp in the external environment images obtained by the first cameras.

The second time stamp adding unit is configured to add, according to the center time point of exposure, a second time stamp in the external environment images obtained by the second cameras.

The first time synchronization unit is configured to synchronize the time of the head-mounted display and the time of the gamepad by aligning the first time stamp and the second time stamp.

In at least one exemplary embodiment, the second time synchronization module may further include: a third time stamp adding unit and a fourth time stamp adding unit.

The third time stamp adding unit is configured to add, based on data interruption, a third time stamp to the inertial data of the head-mounted display obtained by the first inertial sensor, wherein the third time stamp with a deviation corrected is obtained by subtracting a time latency of the first inertial sensor from the third time stamp.

The fourth time stamp adding unit is configured to add, based on data interruption, a fourth time stamp to the inertial data of the gamepad obtained by the second inertial sensor, wherein the fourth time stamp with a deviation corrected is obtained by subtracting a time latency of the second inertial sensor from the fourth time stamp.

The third time stamp with the deviation corrected and the fourth time stamp with the deviation corrected are contained in a data signal, and the time of the head-mounted display and the time of the gamepad are synchronized by the first time synchronization module.

In at least one exemplary embodiment, the VR system may further include a third time synchronization module, configured to synchronize the time of the head-mounted display and the time of the gamepad according to an image transmission latency, and evaluate an image transmission latency between the second wireless transmission module and the first wireless transmission module according to gray scale images of the external environment images obtained by the second cameras.

In at least one exemplary embodiment, the first cameras and the second cameras are fisheye cameras.

In at least one exemplary embodiment, the plurality of first cameras and the plurality of second cameras are configured to obtain the external environment images from different angles.

In at least one exemplary embodiment, the gamepad may further include an operating portion, the operating portion includes a multi-degree-of-freedom motion operated key, and the second cameras are configured to obtain the external environment images including a set area of the multi-degree-of-freedom motion operated key.

In at least one exemplary embodiment, the inertial data of the head-mounted display includes relative position information of the head-mounted display and relative pose information of the head-mounted display, and the inertial data of the gamepad includes relative position information of the gamepad and relative pose information of the gamepad.

The embodiments of the present disclosure also provide a positioning and tracking method of a VR system, the VR system includes a head-mounted display and a gamepad, and the positioning and tracking method includes the following operations.

A plurality of first cameras are arranged on the head-mounted display to obtain external environment images of a coordinate system of the head-mounted display.

A plurality of second cameras are arranged on the gamepad to obtain external environment images of a coordinate system of the gamepad.

Inertial data of the head-mounted display and inertial data of the gamepad are obtained through a first inertial sensor and a second inertial sensor, respectively.

6DOF data of the head-mounted display under a world coordinate system is obtained based on the inertial data of the head-mounted display and the external environment images of the coordinate system of the head-mounted display obtained by the first cameras, 6DOF data of the gamepad under the world coordinate system is obtained based on the external environment images of the coordinate system of the gamepad obtained by the second cameras and the inertial data of the gamepad obtained by the second inertial sensor, and 6DOF data of the gamepad on the head-mounted display is generated.

In at least one exemplary embodiment, the positioning and tracking method may further include the following operation.

Time of the plurality of first cameras of the head-mounted display and time of the plurality of second cameras on the gamepad are synchronized.

In at least one exemplary embodiment, the operation that the time of the plurality of first cameras of the head-mounted display and the time of the plurality of second cameras on the gamepad are synchronized includes the following operation.

The time of the head-mounted display and the time of the gamepad are synchronized by taking the head-mounted display as a master device and the gamepad as a slave device, and a time deviation between the head-mounted display and the gamepad is obtained via transmission of a data signal between the master device and the slave device.

In at least one exemplary embodiment, the master device sends a synchronization signal at time $T1$, the slave device receives the synchronization signal at time $T2$, the master device sends a data packet of the master device containing the time $T1$ to the slave device, after a latency of set time, the slave device sends a data packet of the slave device containing time $T3$ to the master device at the time $T3$, the master device receives the data packet of the slave device at time $T4$, the master device sends a data packet of the master device containing the time $T4$ to the slave device, and a time deviation $T0$ between the head-mounted display and the gamepad is obtained through the following equation:

$$T0=(T2-T1-T4+T3)/2.$$

In at least one exemplary embodiment, the operation that the time of the plurality of first cameras of the head-mounted display and the time of the plurality of second cameras on the gamepad are synchronized includes the following operation.

The time of the plurality of first cameras of the head-mounted display and the time of the plurality of second cameras on the gamepad are synchronized based on a time stamp.

In at least one exemplary embodiment, the operation that the time of the plurality of first cameras of the head-mounted display and the time of the plurality of second cameras on the gamepad are synchronized based on the time stamp includes the following operations.

A first time stamp is added, according to a center time point of exposure, in the external environment images obtained by the first cameras.

A second time stamp is added, according to the center time point of exposure, in the external environment images obtained by the second cameras.

The time of the head-mounted display and the time of the gamepad are synchronized by aligning the first time stamp and the second time stamp.

In at least one exemplary embodiment, the positioning and tracking method may further include the following operation.

A time stamp is added, based on data interruption, to pose data obtained by the first inertial sensor, and a third time stamp is obtained by subtracting a time latency of the first inertial sensor from the time stamp.

In at least one exemplary embodiment, the operation that the time of the plurality of first cameras of the head-mounted display and the time of the plurality of second cameras on the gamepad are synchronized includes the following operation.

The time of the head-mounted display and the time of the gamepad are synchronized according to an image transmission latency, and the image transmission latency between a second wireless transmission module in the gamepad and a first wireless transmission module in the head-mounted display is evaluated according to gray scale images of the external environment images obtained by the second cameras.

The embodiments of the present disclosure further provide a computer-readable storage medium, wherein a computer program is stored on the computer-readable storage medium, and the computer program, when being executed by a processor, causes the processor to implement the positioning and tracking method according to any one of the aforementioned embodiments and exemplary embodiments.

In the VR system and the positioning and tracking method of the VR system according to the embodiments of the present disclosure, external environment images of the gamepad are obtained by second cameras newly added on the gamepad, and the external environment images are sent to the head-mounted display for processing to directly generate 6DOF data of the gamepad, thereby achieving a high-precision and low-latency 6DOF solution.

The realization of objectives, functional features and advantages of the present disclosure will be further described in conjunction with the embodiments and with reference to the accompanying drawings.

DETAILED DESCRIPTION OF THE EMBODIMENTS

It should be understood that the exemplary embodiments and implementations described herein are merely used to explain the present disclosure but are not intended to limit the present disclosure.

There are two positioning technologies for head-mounted display devices, one is based on outside-in Tracking technology, which is currently mainstream, but this technology also has some disadvantages, for example, a user's movable range is limited to a sensor's monitoring range, there is a need to use external sensors, and the range is easily affected by obstructions. The other is based on inside-out tracking technology which does not need any external sensor, can be used in an environment without hardware construction and marking, is not limited by the monitoring range of a sensor, and therefore has more mobility and a higher degree of freedom.

The embodiments of the present disclosure adopt an inside-out tracking VR system that supports large scene tracking of an HMD, especially adaptive tracking of a gamepad. Environment images are obtained by second footing apparatuses on the gamepad. The HMD can accurately determine a position of the gamepad in a world coordinate system, that is, locate and track the gamepad and realize a 6DOF Function of the gamepad in a VR all-in-one machine. 6DOF, having a total of six degrees of freedom, can be divided into two distinct types: a translatable and rotatable rigid body can translate in 3 degrees of freedom: forward/backward, upward/downward, and leftward/rightward, and can also rotate in 3 degrees of freedom: pitch, roll, and yaw. Thus, 3 types of translational degrees of freedom+3 types of rotational degrees of freedom=6 degrees of freedom.

Figure 1:
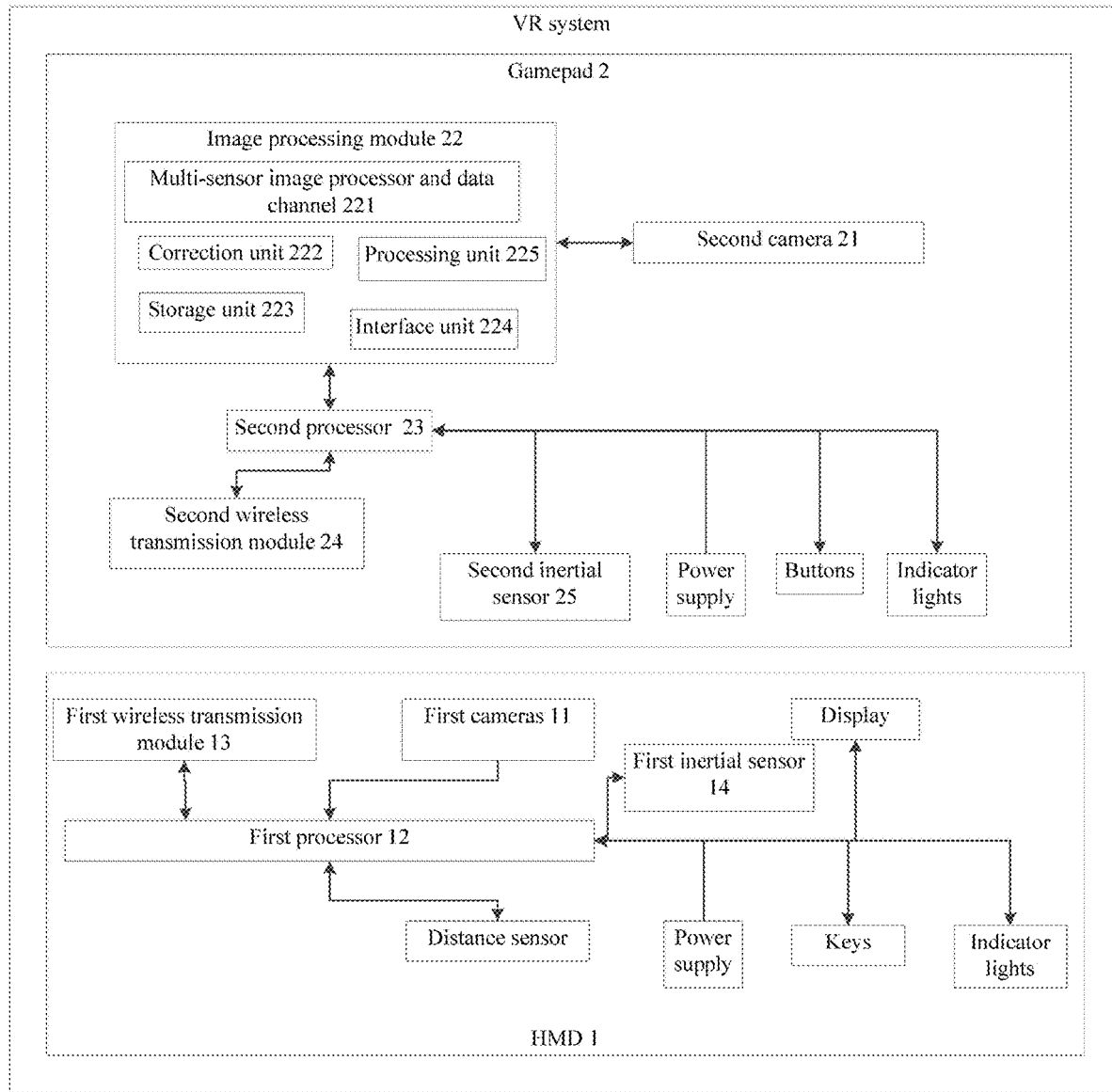
FIG. 1 is a block diagram of a VR system according to some embodiments of the present disclosure.

FIG. 1 is a block diagram of a VR system according to some embodiments of the present disclosure. As shown in FIG. 1, the VR system includes an HMD 1 and a gamepad 2. The HMD includes a first processor 12, a first inertial sensor 14, and a plurality of first cameras 11. The gamepad 2 includes a second inertial sensor 25 and a plurality of second cameras 21. The first inertial sensor 14 is configured to obtain inertial data of the head-mounted display. The first cameras 11 are configured to obtain external environment images of a coordinate system of the head-mounted display. The second cameras 21 are configured to obtain external environment images of a coordinate system of the gamepad. The second inertial sensor 25 is configured to obtain inertial data of the gamepad. The first processor 12 is configured to obtain 6DOF data of the head-mounted display in a world coordinate system based on the inertial data of the head-mounted display and the external environment images of the coordinate system of the head-mounted display obtained by the first cameras, obtain 6DOF data of the gamepad under the world coordinate system based on the external environment images of the coordinate system of the gamepad obtained by the second shooting devices and the inertial data of the gamepad obtained by the second inertial sensor, and generate 6DOF data of the gamepad on the head-mounted display.

The first inertial sensor and the second inertial sensor are Inertial Measurement Units (IMUs), which are electronic devices that measure and report speed, direction, and gravity through the sensors. The inertial measurement units may include a combination of one or more of accelerometers, gyroscopes, and magnetometers that can obtain inertial data, including relative position information and relative attitude information, for the head-mounted display and the gamepad, respectively.

In an embodiment, the VR system may further include a first time synchronization module, configured to synchronize the time of the head-mounted display and the time of the gamepad by taking the head-mounted display as a master device and the gamepad as a slave device, and obtaining a time deviation between the head-mounted display and the gamepad via transmission of a data signal between the master device and the slave device.

In an exemplary embodiment, a data signal between the master device and the slave device is sent wirelessly, that is, the head-mounted display may further include a first wireless transmission module, and the gamepad may further include a second wireless transmission module.

As an exemplary implementation, the first wireless transmission module and the second wireless transmission module are configured to parse and return a data signal at a physical layer, ensuring that data link transmission time is the same when the master device and the slave device interacts.

As an exemplary implementation, the first wireless transmission module is configured to send a synchronization signal at time T1, the second wireless transmission module is configured to receive the synchronization signal at time T2, the first wireless transmission module is configured to send a data packet of the master device containing the time T1 to the slave device, after a latency of set time, the second wireless transmission module is configured to send a data packet of the slave device containing time T3 to the master device at the time T3, the master device is configured to receive the data packet of the slave device at time T4, the first wireless transmission module is configured to send a data packet of the master device containing the time T4 to the slave device, and the first time synchronization module is configured to obtain a time deviation T0 between the head-mounted display and the gamepad through the following equation:

$$T0=(T2-T1-T4+T3)/2.$$

In an embodiment, the VR system may further include a second time synchronization module configured to synchronize time of the head-mounted display and time of the gamepad based on a time stamp, and the second time synchronization module includes: a first time stamp adding unit, a second time stamp adding unit, and a first time synchronization unit.

The first time stamp adding unit is configured to add, according to a center time point of exposure, a first time stamp in the external environment images obtained by the first cameras.

The second time stamp adding unit is configured to add, according to the center time point of exposure, a second time stamp in the external environment images obtained by the second cameras.

The first time synchronization unit is configured to synchronize the time of the head-mounted display and the time of the gamepad by aligning the first time stamp and the second time stamp.

As an exemplary implementation, the second time synchronization module may further include: a third time stamp adding unit and a fourth time stamp adding unit.

The third time stamp adding unit is configured to add, based on data interruption, a third time stamp to the inertial data of the head-mounted display obtained by the first inertial sensor, wherein the third time stamp with a deviation corrected is obtained by subtracting a time latency of the first inertial sensor from the third time stamp.

The fourth time stamp adding unit is configured to add, based on data interruption, a fourth time stamp to the inertial data of the gamepad obtained by the second inertial sensor, wherein the fourth time stamp with a deviation corrected is obtained by subtracting a time latency of the second inertial sensor from the fourth time stamp.

The third time stamp with the deviation corrected and the fourth time stamp with the deviation corrected are contained in a data signal, and the time of the head-mounted display and the time of the gamepad are synchronized by the first time synchronization module.

In an embodiment, the VR system may further include a third time synchronization module, configured to synchronize the time of the head-mounted display and the time of the gamepad according to an image transmission latency, and evaluate an image transmission latency between the second wireless transmission module and the first wireless transmission module according to gray scale images of the external environment images obtained by the second cameras.

In an exemplary embodiment of the present disclosure, the head-mounted display 1 includes a plurality of first cameras 11, a first processor 12, a first wireless transmission module 13, a first inertial sensor 14, a distance sensor, a power supply, keys, indicator lights, and a display.

The gamepad 2 includes a second camera 21, an image processing module 22, a second processor 23, a second wireless transmission module 24, a second inertial sensor 25, a power supply, buttons, and indicator lights. The image processing module 22 includes a multi-sensor image processor and data lane 221, a correction unit 222, a storage unit 223, an interface unit 224, and a processing unit 225.

After the head-mounted display 1 is started, the first wireless transmission module and the second wireless transmission module establish a wireless connection. Inertial data of the head-mounted display is detected by the first inertial sensor and sent to the first processor. The inertial data of the head-mounted display includes relative position information and relative posture information of the head-mounted display, for example, acceleration, angle, direction and other information of the head-mounted display are sent to the first processor. Inertial data of the gamepad is detected by the second inertial sensor. The inertial data of the gamepad includes relative position information and relative posture information of the gamepad, for example, acceleration, angle, direction and other information of the gamepad are sent to the second processor and sent to the first processor through the second wireless transmission module and the first wireless transmission module. External environment images of a coordinate system of the head-mounted display are obtained by the first cameras of the head-mounted display. The inertial data of the head-mounted display and the external environment images of the head-mounted display obtained by the first cameras are directly sent to the first processor. External environment images of a coordinate system of the gamepad are obtained by the second cameras and sent to the image processing module. The multi-sensor image processor and data lanes perform color space conversion and multi-lane data transmission on the images. The correction unit 222 filters out abnormal data in multi-lane data. The storage unit 223 is configured to store instructions, and the instructions are used to control the second processor to operate in combination with the first processor 12 to perform any one of the time synchronization methods provided by the embodiments of the present disclosure. External environment images of the gamepad are sent to the first processor through the second wireless transmission module and the first wireless transmission module. The first processor is configured to obtain 6DOF data of the head-mounted display under a world coordinate system based on the inertial data of the head-mounted display and the external environment images of the coordinate system of the head-mounted display obtained by the first cameras, obtain 6DOF data of the gamepad under the world coordinate system based on the external environment images of the coordinate system of the gamepad obtained by the second cameras and the inertial data of the gamepad obtained by the second inertial sensor, and generate 6DOF data of the gamepad on the head-mounted display. The second processor is also configured process different types of data between the image processing module 22 and the second processor and between the second processor and the second wireless transmission module. The interface unit 224 includes interfaces that connect the second cameras and the processing unit 225 and an interface that connects the storage unit 223 and the second processor 23.

It will be appreciated by those having ordinary skill in the art that although multiple apparatuses are shown in FIG. 1 for both the head-mounted display and the gamepad, the embodiments of the present disclosure may refer only to portions of the apparatuses therein, and instructions may be devised by those having ordinary skill in the art in light of the embodiments of the present disclosure. How the instructions control the processor to operate is well known in the art and will not be described in detail herein.

Figure 2:
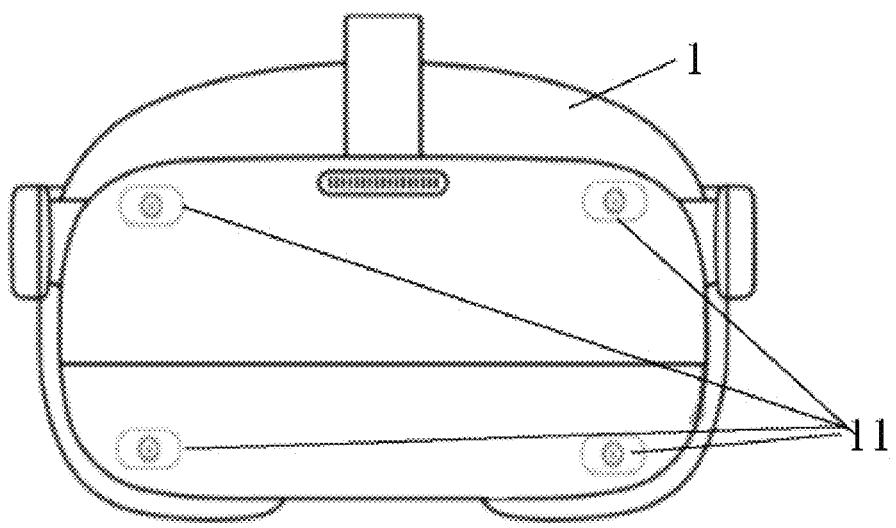
FIG. 2 is a schematic diagram of a head-mounted display according to some embodiments of the present disclosure.
Figure 3:
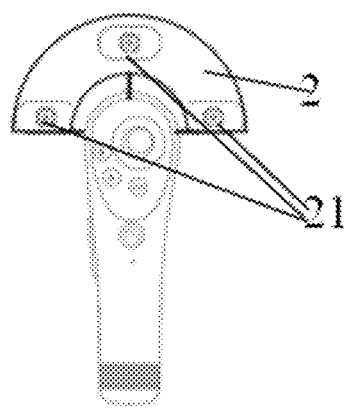
FIG. 3 is a schematic diagram of a gamepad according to some embodiments of the present disclosure.

In some example implementations of some embodiments of the present disclosure, as shown in FIGS. 2 and 3, a plurality of first cameras are arranged on the head-mounted display, a plurality of second cameras are arranged on the gamepad, and environmental images are obtained from different angles. As an exemplary implementation, the first cameras and the second cameras are fisheye cameras.

As an exemplary implementation, four first cameras are arranged on the head-mounted display, three second cameras are arranged on the gamepad, the four first cameras are located at the same height and are respectively located at four top corners of a rectangle on an outer surface of the head-mounted display, and the three second cameras are arranged on a bisector of a bulge at an edge ring of the gamepad.

As shown in FIG. 3, the gamepad includes an operation part and an optical part, and the optical part intersects with one end of the operation part. The operation part includes a multi-degree-of-freedom motion operated key, the optical part includes a plurality of second cameras, and the second cameras are configured to obtain external environment images including a set area of the multi-degree-of-freedom motion operated key.

Figure 4:
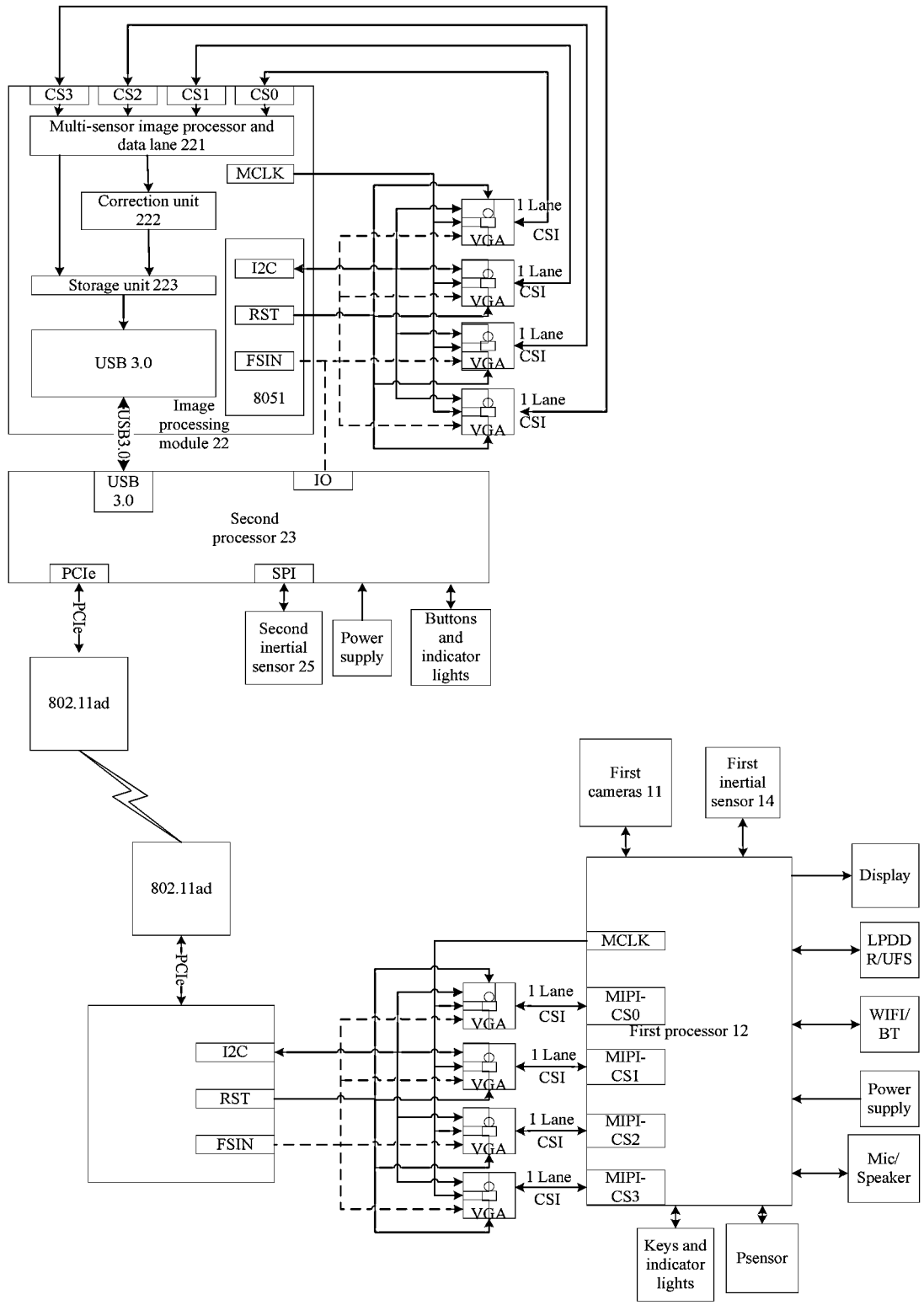
FIG. 4 is a schematic diagram of an exemplary implementation of a VR system according to some embodiments of the present disclosure.

As shown in FIG. 4, the HMD is a 6DOF tracking system composed of a plurality of fisheye cameras, and synchronization of the fisheye cameras is realized. The HMD also includes an independent wireless chip (a first wireless transmission module) supporting 802.11 ad, providing time synchronization of the gamepad and the HMD, and sending IMU data and key data of the gamepad. Image data at the gamepad can be sent to the HMD with low time latency to implement functions such as gamepad tracking, see through and other functions via the fisheye cameras of the gamepad. The HMD may further include an inertial measurement unit, a key device for realizing HMD 6DOF, as well as a display portion, a storage portion, a wireless portion, a sound portion, a power portion, buttons, indicator lights, a distance sensor, etc.

The gamepad is a 6DOF tracking system composed of a plurality of fisheye cameras, and synchronization of the fisheye cameras is realized. The gamepad also includes an independent wireless chip (second wireless transmission module), supporting 802.11 ad, providing time synchronization between the gamepad and the HMD system, and sending IMU data, key data, 6DOF data and other data of the gamepad. The wireless chip can send image data of the gamepad to the HMD to realize a tracking function and a see through function for the gamepad. The gamepad also includes a multipath MIPI to USB processor, and a USB 3.0 to PCIe processor (second processor 23).

In the gamepad, the fisheye cameras are connected to the multi-sensor image processor and a data lane 221 through a COMS Sensor Interface (CSI) for image transmission, are connected to an 8051 (processing unit 225) through an I2C, and are driven by the I2C. The plurality of fisheye cameras are configured, through an RST pin during initialization, to work in sequence. When each fisheye works, an I2C address of each fisheye camera is set respectively. An FSIN pin of 8051 is connected to the plurality of fisheye cameras. The fisheye cameras reset an output clock after receiving an FSIN signal, and MIPI data are output after a period of time. The FSIN signal does not change generated signals. In order to ensure stability of the system, after exposure signals are finished, the synchronization function of the fisheye cameras can be completed before synchronization signals are sent to the head-mounted display, so that both the synchronization function and the stability of the signals are guaranteed. The synchronization signal may be the same as a frame rate signal of the fisheye cameras, and may be ½ of the frame rate, etc.

Figure 5:
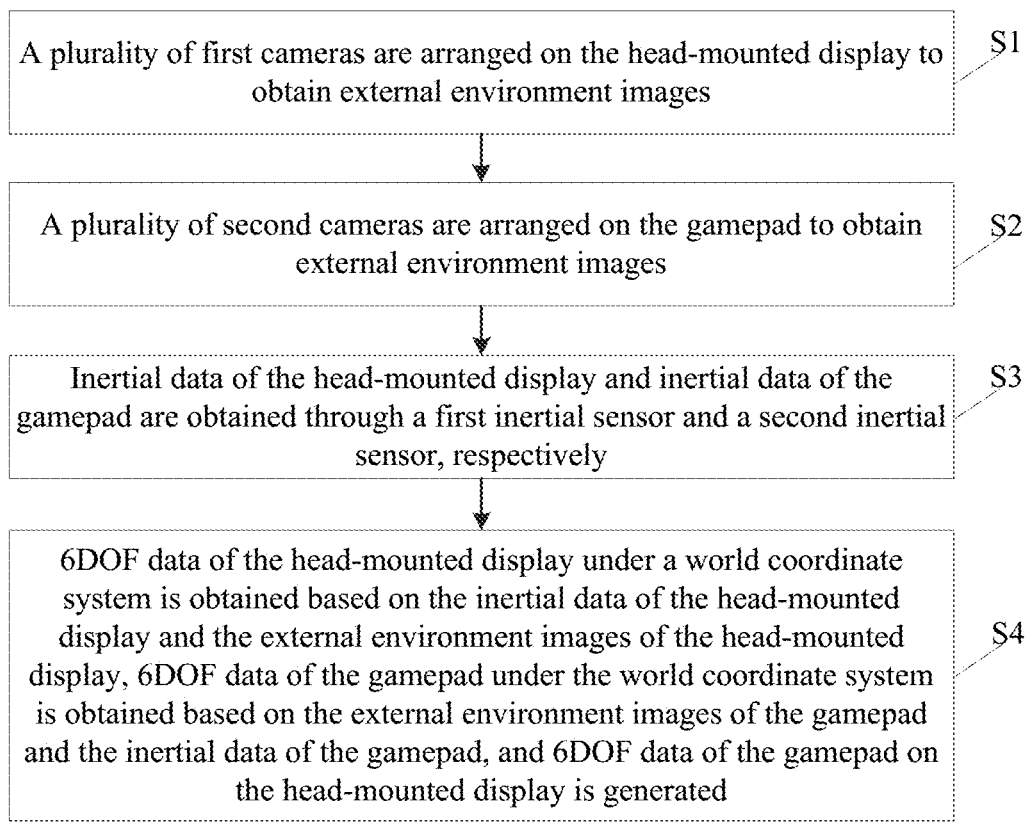
FIG. 5 is a flowchart of a positioning and tracking method of a VR system according to some embodiments of the present disclosure.

FIG. 5 is a flowchart of a positioning and tracking method of a VR system according to some embodiments of the present disclosure. As shown in the FIG. 5, the positioning and tracking method includes the following operations S1 to S4.

In S1, a plurality of first cameras are arranged on the head-mounted display to obtain external environment images of a coordinate system of the head-mounted display.

In S2, a plurality of second cameras are arranged on the gamepad to obtain external environment images of a coordinate system of the gamepad.

In S3, inertial data of the head-mounted display and inertial data of the gamepad are obtained through a first inertial sensor and a second inertial sensor, respectively.

In S4, 6DOF data of the head-mounted display under a world coordinate system is obtained based on the inertial data of the head-mounted display and the external environment images of the coordinate system of the head-mounted display obtained by the first cameras, 6DOF data of the gamepad under the world coordinate system is obtained based on the external environment images of the coordinate system of the gamepad obtained by the second cameras and the inertial data of the gamepad obtained by the second inertial sensor, and 6DOF data of the gamepad on the head-mounted display is generated.

In an embodiment, the positioning and tracking method may further include an operation of synchronizing time of the plurality of first cameras of the head-mounted display and time of the plurality of second cameras on the gamepad.

In an embodiment, the operation of synchronizing the time of the plurality of first cameras of the head-mounted display and the time of the plurality of second cameras on the gamepad includes the following operation. The time of the head-mounted display and the time of the gamepad are synchronized by taking the head-mounted display as a master device and the gamepad as a slave device, and obtaining a time deviation between the head-mounted display and the gamepad via transmission of a data signal between the master device and the slave device.

Figure 6:
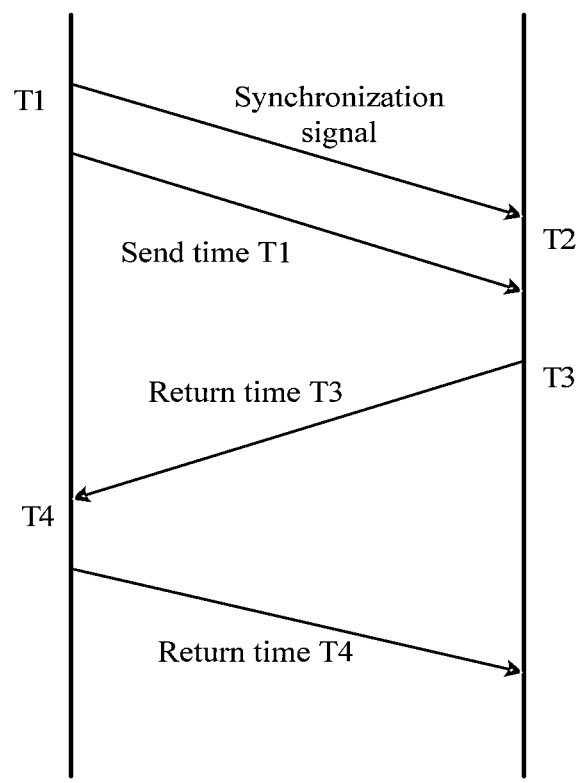
FIG. 6 is a schematic diagram of an implementation of time synchronization between the head-mounted display and the gamepad according to some embodiments of the present disclosure.

As an exemplary implementation, as shown in FIG. 6, the master device sends a synchronization signal at time T1, the slave device receives the synchronization signal at time T2, the master device sends a data packet of the master device containing the time T1 to the slave device, after a latency of set time, the slave device sends a data packet of the slave device containing time T3 to the master device at the time T3, the master device receives the data packet of the slave device at time T4, the master device sends a data packet of the master device containing the time T4 to the slave device, and a time deviation T0 between the head-mounted display and the gamepad is obtained through following equations, specifically:

$$T2-T1=Td+\text{To}$$

$$T4-T3=Td-\text{To}$$

$$Td=(T2-T1+T4-T3)/2$$

$$T0=(T2-T1-T4+T3)/2.$$

Td is a wireless data transmission time.

Figure 7:
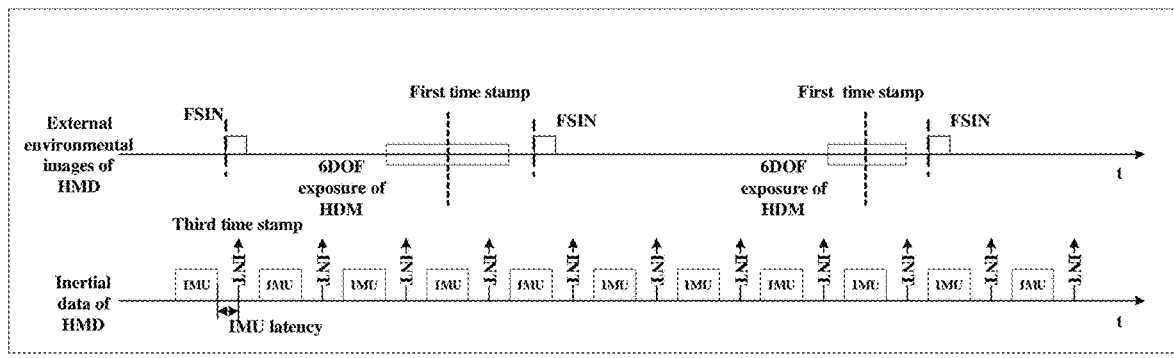
FIG. 7 is a schematic diagram of another implementation of time synchronization between the head-mounted display and the gamepad according to some embodiments of the present disclosure.
Figure 7:
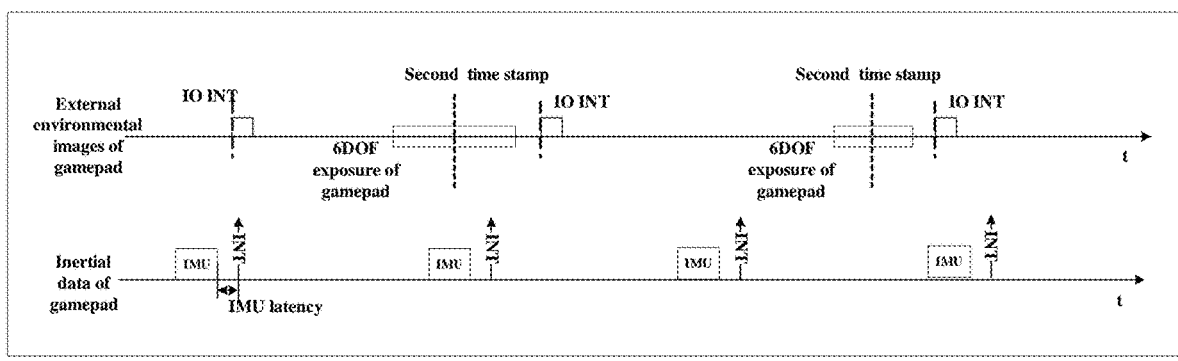

In an embodiment, as shown in FIG. 7, the operation of synchronizing the time of the plurality of first cameras of the head-mounted display and the time of the plurality of second cameras on the gamepad includes the following operation. The time of the plurality of first cameras of the head-mounted display and the time of the plurality of second cameras on the gamepad are synchronized based on a time stamp, which specifically includes the following operations.

A first time stamp is added, according to a center time point of exposure, in the external environment images obtained by the first cameras.

A second time stamp is added, according to the center time point of exposure, in the external environment images obtained by the second cameras.

The time of the head-mounted display and the time of the gamepad are synchronized by aligning the first time stamp and the second time stamp.

As an exemplary implementation, the method may further include the following operation. A time stamp is added, based on data interruption, to pose data obtained by the first inertial sensor, and a third time stamp is obtained by subtracting a time latency of the first inertial sensor from the time stamp.

In an exemplary embodiment, time stamps of the external environment images obtained by the first cameras of the HMD are added according to a center time point of exposure, the time stamps may be calculated based on an FSIN signal and an exposure time, or may be calculated based on an MIPI SOF signal (MIPI frame start signal) and the exposure time. In an exemplary embodiment, time stamps of IMU data (inertial data) in the HMD are added based on data interruption. There is a certain IMU Latency (inertial latency) between the physical occurrence and interruption generation at the IMU, and the inertial latency can be determined according to IMU configuration filter parameters. The latency time is subtracted from the time stamp after the time stamp is added to the interruption so as to obtain accurate time stamp data.

The gamepad needs to be added with an IMU time stamp. After an HMD time system and a gamepad time system are synchronized, the image processing module calculates a time stamp of an image based on an interruption triggered by FSIN and exposure data. By adding the IMU time stamp when the IMU generates interruption, and subtracting the latency of the IMU from the time stamp, accurate time stamp data is obtained.

The plurality of first cameras realize an image synchronization function through FSIN signals. The HMD and the gamepad realize synchronization of the HMD time system and the gamepad time system through wireless signals. After an image frame rate and basic parameter settings are determined, a center point of optical tracking exposure of the gamepad and the FSIN signals have a fixed time interval, and thus a time point of HMD to track the gamepad can be determined.

Figure 8:
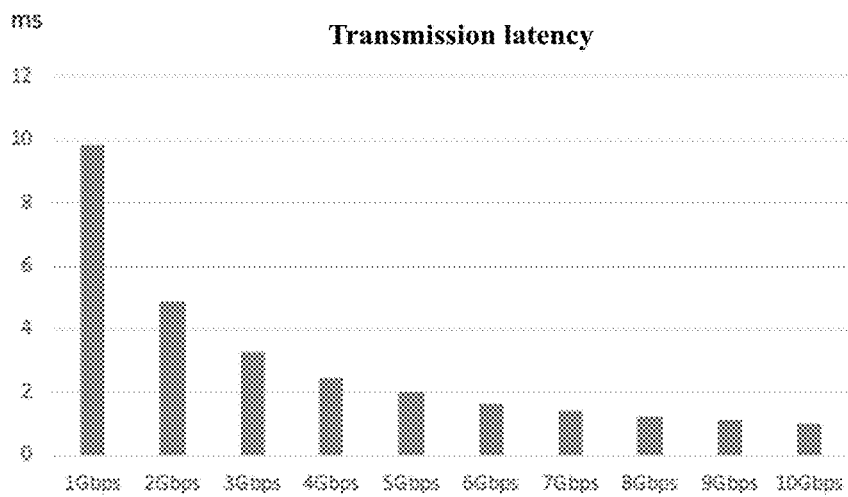
FIG. 8 is a schematic diagram of a third implementation of time synchronization between the head-mounted display and the gamepad according to some embodiments of the present disclosure.

In an embodiment, as shown in FIG. 8, the operation of synchronizing the time of the plurality of first cameras of the head-mounted display and the time of the plurality of second cameras on the gamepad includes the following operation. The time of the plurality of first cameras of the head-mounted display and the time of the plurality of second cameras on the gamepad are synchronized according to an image transmission latency, and the image transmission latency between the second wireless transmission module and the first wireless transmission module is evaluated according to gray scale images of the external environment images obtained by the second cameras.

In an exemplary embodiment, a wireless transmission latency is evaluated in terms of 4 CMOS, grayscale images with a resolution of 640×480 8 bits, and a relatively stable 4 Gbps bandwidth of 802.11 ad, and the wireless transmission latency is around 2 ms. The 802.11 ad uses a 60 GHz band, having less interference and stable transmission, which benefits performance and stability of 6DOF. The short transmission distance of 802.11 ad reduces the interaction of multiple sets of apparatuses.

The VR system and the positioning and tracking method of the VR system adopt inside-out tracking that supports large scene tracking of an HMD, especially adaptive tracking of a gamepad. Based on environment images obtained by the gamepad, the HMD can accurately determine a position of the gamepad in a world coordinate system.

In the several embodiments provided in the present disclosure, it should be understood that the disclosed system and method may be implemented in other manners. For example, the described apparatus embodiment is merely an example. For example, the module division is merely logical function division, and may adopt other division during actual implementation.

The modules described as separate parts may or may not be physically separated. The parts shown as modules may or may not be physical units, namely, these parts may be located in the same place, or may also be distributed to multiple network units. Some or all the modules may be selected according to actual needs to achieve the objectives of the solutions of the embodiments.

In addition, functional modules in the embodiments of the present disclosure may be integrated into one processing unit, or each of the units may exist alone physically, or two or more units may be integrated into one unit. The integrated unit may be implemented in a form of hardware, or may be implemented in a form of a hardware plus software functional module.

It will be apparent to those having ordinary skill in the art that the present disclosure is not limited to the details of the above-described exemplary embodiments, and that the present disclosure can be embodied in other specific forms without departing from the essential characteristics of the embodiments of the present disclosure.

The present embodiments are, therefore, to be considered in all respects as illustrative and not restrictive, the scope of the present disclosure being indicated by the appended claims rather than by the foregoing description, and all changes which come within the meaning and range of equivalency of the claims are therefore intended to be embraced therein. Any associated reference signs of figures in the claims shall not be construed as limiting the claim concerned.

Furthermore, it is apparent that the word "include" does not exclude other elements or operations, and the singular does not exclude the plural form. A plurality of units or apparatuses recited in the system claims may also be implemented by one unit or apparatus in software or hardware. The terms second and the like are used to denote names and do not denote any particular order.

Finally, it is to be noted that the foregoing embodiments are merely intended to describe the technical solutions of the present disclosure, but not intended to constitute any limitation. Although the present disclosure is described in detail with reference to exemplary embodiments, persons having ordinary skill in the art should understand that modifications or equivalent replacements can be made to the technical solutions of the present disclosure, without departing from the essence of the technical solutions of the present disclosure.

What is claimed is:

1. A Virtual Reality (VR) system, comprising a head-mounted display and a gamepad, wherein the head-mounted display comprises a first inertial sensor, a first processor, and a plurality of first cameras, the gamepad comprises a second inertial sensor and a plurality of second cameras, the first cameras are configured to obtain external environment images of the head-mounted display, the first inertial sensor is configured to obtain inertial data of the head-mounted display, the second cameras are configured to obtain external environment images of the gamepad, the second inertial sensor is configured to obtain inertial data of the gamepad, and the first processor is configured to obtain pose data of the head-mounted display under a world coordinate system based on the inertial data of the head-mounted display and the external environment images of the head-mounted display obtained by the first cameras, and obtain pose data of the gamepad under the world coordinate system based on the external environment images of the gamepad obtained by the second cameras and the inertial data of the gamepad obtained by the second inertial sensor, wherein the first processor is further configured to synchronize time of the head-mounted display and time of the gamepad by taking the head-mounted display as a master device and the gamepad as a slave device, and obtain a time deviation between the head-mounted display and the gamepad via transmission of a data signal between the master device and the slave device, wherein the head-mounted display further comprises a first wireless transmission module, and the gamepad further comprises a second wireless transmission module, and wherein the first processor is further configured to synchronize the time of the head-mounted display and the time of the gamepad according to an image transmission latency, and evaluate an image transmission latency between the second wireless transmission module and the first wireless transmission module according to gray scale images of the external environment images obtained by the second cameras, wherein the first processor is further configured to synchronize the time of the head-mounted display and the time of the gamepad by a time stamp, wherein the first processor is configured to:

add, according to a center time point of exposure, a first time stamp in the external environment images obtained by the first cameras;

add, according to the center time point of exposure, a second time stamp in the external environment images obtained by the second cameras; and synchronize the time of the head-mounted display and the time of the gamepad by aligning the first time stamp and the second time stamp.

2. The VR system according to claim 1, wherein the first wireless transmission module is configured to send a synchronization signal at time T1, the second wireless transmission module is configured to receive the synchronization signal at time T2, the first wireless transmission module is configured to send a data packet of the master device containing the time T1 to the slave device, after a latency of set time, the second wireless transmission module is configured to send a data packet of the slave device containing time T3 to the master device at the time T3, the master device is configured to receive the data packet of the slave device at time T4, the first wireless transmission module is configured to send a data packet of the master device containing the time T4 to the slave device, and the first processor is configured to obtain a time deviation T0 between the head-mounted display and the gamepad through the following equation:

$$T0=(T2-T1-T4+T3)/2.$$

3. The VR system according to claim 1, wherein the first processor is further configured to:

add, based on data interruption, a third time stamp to the inertial data of the head-mounted display obtained by the first inertial sensor, wherein the third time stamp with a deviation corrected is obtained by subtracting a time latency of the first inertial sensor from the third time stamp; and add, based on data interruption, a fourth time stamp to the inertial data of the gamepad obtained by the second inertial sensor, wherein the fourth time stamp with a deviation corrected is obtained by subtracting a time latency of the second inertial sensor from the fourth time stamp;

wherein the third time stamp with the deviation corrected and the fourth time stamp with the deviation corrected are contained in the data signal, and the time of the head-mounted display and the time of the gamepad are synchronized by the first processor.

4. The VR system according to claim 2, wherein the first cameras and the second cameras are fisheye cameras.

5. The VR system according to claim 1, wherein the gamepad further comprises an operating portion, wherein the operating portion comprises a multi-degree-of-freedom motion operated key, and the second cameras are configured to obtain the external environment images comprising a set area of the multi-degree-of-freedom motion operated key.

6. The VR system according to claim 1, wherein the inertial data of the head-mounted display comprises relative position information of the head-mounted display and relative pose information of the head-mounted display, and the inertial data of the gamepad comprises relative position information of the gamepad and relative pose information of the gamepad.

7. A positioning and tracking method of a Virtual Reality (VR) system, the VR system comprising a head-mounted display and a gamepad, wherein the positioning and tracking method comprises:

obtaining external environment images through a plurality of first cameras of the head-mounted display;

obtaining external environment images through a plurality of second cameras of the gamepad;

obtaining inertial data of the head-mounted display and inertial data of the gamepad through a first inertial sensor and a second inertial sensor, respectively; and obtaining pose data of the head-mounted display under a world coordinate system based on the inertial data of the head-mounted display and the external environment images of the head-mounted display obtained by the first cameras, and obtaining pose data of the gamepad under the world coordinate system based on the external environment images of the gamepad obtained by the second cameras and the inertial data of the gamepad obtained by the second inertial sensor, wherein the positioning and tracking method of the VR system further comprises:

synchronizing time of the plurality of first cameras of the head-mounted display and time of the plurality of second cameras on the gamepad based on a time stamp, comprising:

synchronizing the time of the head-mounted display and the time of the gamepad by taking the head-mounted display as a master device and the gamepad as a slave device, and obtaining a time deviation between the head-mounted display and the gamepad via transmission of a data signal between the master device and the slave device; and synchronizing the time of the head-mounted display and the time of the gamepad according to an image transmission latency, and evaluating the image transmission latency between a second wireless transmission module in the gamepad and a first wireless transmission module in the head-mounted display according to gray scale images of the external environment images obtained by the second cameras, wherein synchronizing the time of the plurality of first cameras of the head-mounted display and the time of the plurality of second cameras on the gamepad based on the time stamp comprises:

adding, according to a center time point of exposure, a first time stamp in the external environment images obtained by the first cameras;

adding, according to the center time point of exposure, a second time stamp in the external environment images obtained by the second cameras; and synchronizing the time of the head-mounted display and the time of the gamepad by aligning the first time stamp and the second time stamp.

8. The positioning and tracking method of the VR system according to claim 7, wherein the master device sends a synchronization signal at time $T1$, the slave device receives the synchronization signal at time $T2$, the master device sends a data packet of the master device containing the time $T1$ to the slave device, after a latency of set time, the slave device sends a data packet of the slave device containing time $T3$ to the master device at the time $T3$, the master device receives the data packet of the slave device at time $T4$, the master device sends a data packet of the master device containing the time $T4$ to the slave device, and a time deviation TO between the head-mounted display and the gamepad is obtained through the following equation:

$$T0=(T2-T1-T4+T3)/2.$$

9. The positioning and tracking method of the VR system according to claim 7, further comprising:

adding, based on data interruption, a time stamp to pose data obtained by the first inertial sensor, and subtracting a time latency of the first inertial sensor from the time stamp to obtain a third time stamp.

10. A non-transitory computer-readable storage medium, wherein a computer program is stored on the non-transitory computer-readable storage medium, and the computer program, when being executed by a processor, causes the processor to implement the method according to claim 7.

* * * * *